March 7, 1967 — H. W. KRUGER — 3,307,270
DRYING APPARATUS AND METHOD
Filed Oct. 21, 1965 — 2 Sheets-Sheet 1

INVENTOR
HERBERT W. KRUGER
BY
BUCKHORN, CHEATHAM & BLORE
ATTORNEYS

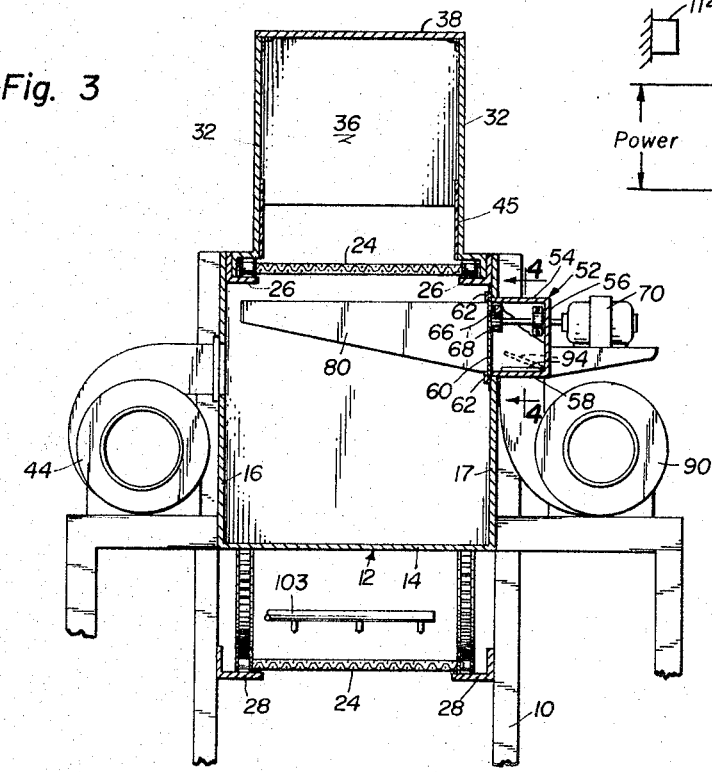
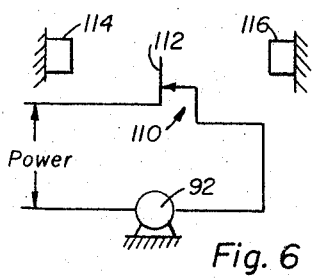
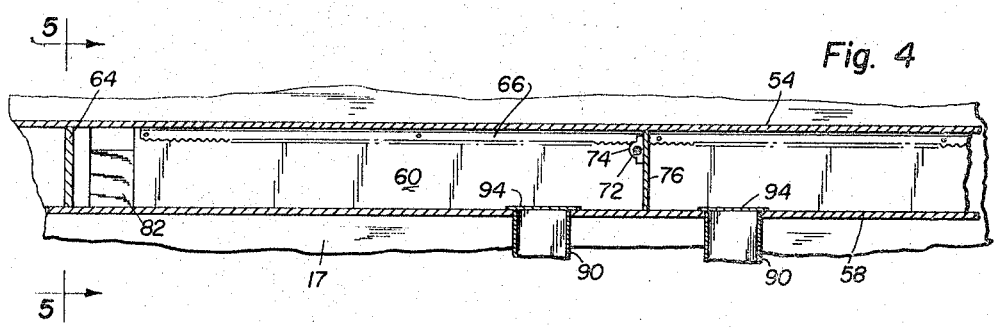
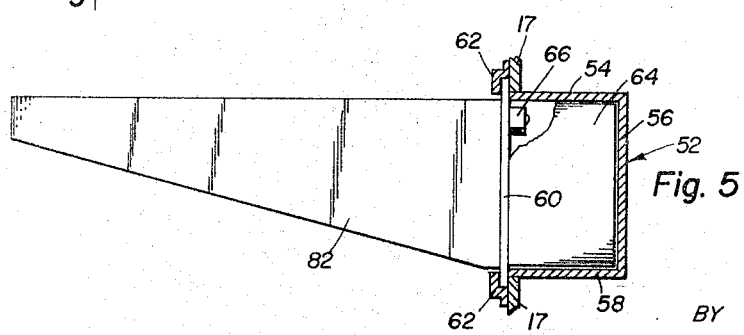
INVENTOR
HERBERT W. KRUGER
BY
BUCKHORN, CHEATHAM & BLORE
ATTORNEYS

# United States Patent Office 3,307,270
Patented Mar. 7, 1967

3,307,270
DRYING APPARATUS AND METHOD
Herbert W. Kruger, Portland, Oreg., assignor to Lamb-Weston, Inc., Portland, Oreg., a corporation of Oregon
Filed Oct. 21, 1965, Ser. No. 507,604
6 Claims. (Cl. 34—10)

This is a continuation-in-part of application Serial No. 209,416 filed July 12, 1962 now abandoned.

The present invention relates to drying apparatus and methods, and more particularly to methods and apparatus for drying shelled green peas and like products.

It has recently been found that shelled green peas which have a normal moisture content of about 75 percent, if dried to a moisture content of about five to seven percent, have an exceedingly long shelf life and can be easily reconstituted by heating with water so as to have an appearance and taste closely resembling fresh cooked green peas. In the dehydration process the green peas are shelled from the pod, size graded if desired, and then passed through a mechanism which pricks or otherwise forms a small opening through the skin of the individual peas to permit ready escape of moisture. The peas are then blanched in a solution containing sodium carbonate and sodium sulfite, the former acting as a tenderizer and the latter as a preservative. After draining, the peas are ready to be passed through a dryer. Difficulty has been encountered, however, in the drying operation. The blanching operation causes the peas to become somewhat sticky, and they tend to adhere to each other until the moisture content is reduced to about 60 percent, making it difficult to pass drying air evenly through a bed of the wet peas so as to dry them evenly. Agitation during drying will help to keep the peas separated so they dry evenly, but the peas are, of course, too tender to permit mechanical agitation thereof.

Accordingly, it is an object of the present invention to provide a new and improved method and apparatus for drying green peas that will eliminate agglomeration thereof and cause drying of the peas in a separated state.

Another object of the present invention is to provide a new and improved drying apparatus wherein green peas can be dried without injury to the same.

Still another object of the invention is to provide a new and improved method for drying particulate products evenly.

A further object of the invention is to provide a method and apparatus for drying particulate products which facilitates control of the drying rate of the product.

A still further object is to provide a new and improved conveyor apparatus.

Still other objects and advantages of the invention will become apparent hereinafter.

In accordance with the illustrated embodiment, the apparatus of the present invention comprises a housing having a permeable support upon which peas to be dried are supported and which support may comprise a permeable conveyor belt. Means are provided to pass drying air into the lower portion of the housing so that it will blow upwardly through the conveyor belt and the peas carried thereon, the volume of air introduced into the housing being controlled so that it does not cause agitation of the peas upon the belt thus enabling substantially even distribution of the air flow through the entire bed of peas. Arranged in the housing beneath the conveyor belt is a nozzle which is adapted to reciprocate lengthwise of the housing and to blow a stream of air upwardly through the belt, the stream being of narrow width in the longitudinal direction of the belt but extending from side to side. The air supply to the nozzle is of such capacity that the air stream is of sufficient velocity to elevate from the belt the peas which are in the path of such air stream. Means are provided to reciprocate the nozzle longitudinally of the conveyor belt at periodic intervals thus enabling periodic elevation of the peas which effects their separation and redepositing of the peas upon the belt in a loosened condition. Agglomeration and adherence of the peas to each other is minimized by this action while at the same time a substantially uniform bed of peas remains on the conveyor so that the a substantially uniform flow of drying air through the undisturbed portion of the bed may occur to obtain uniform, controlled drying of the peas.

For a more detailed description of the invention reference is made to the accompanying drawings wherein:

FIG. 3 is an enlarged sectional view taken along line 3—3 of FIG. 2;

FIG. 4 is a fragmentary sectional view taken along line 4—4 of FIG. 3;

FIG. 5 is a fragmentary sectional view taken along line 5—5 of FIG. 4 and showing details of the nozzle construction; and FIG. 6 is a circuit diagram of a fan control system used in the invention.

Figures 1, 2:
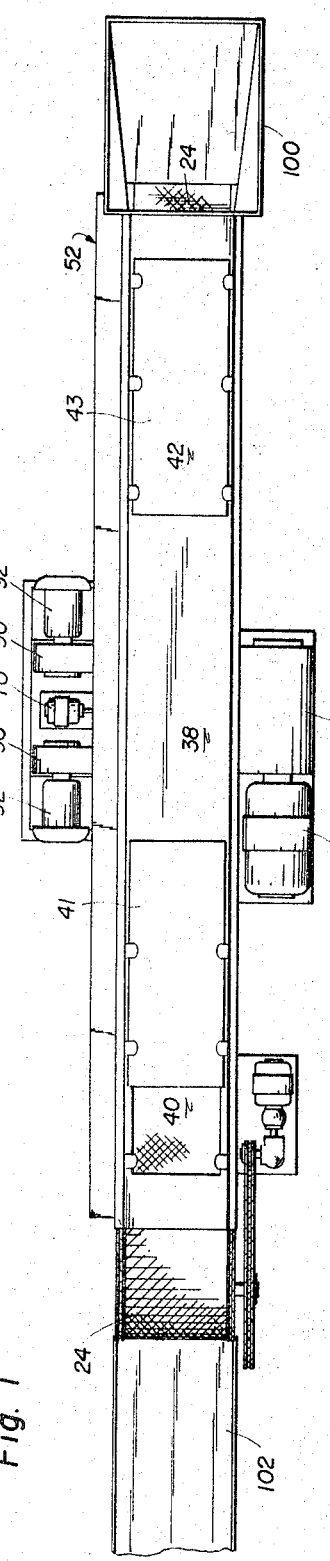
FIG. 1 is a top elevation of apparatus constructed in accordance with the invention.
FIG. 2 is a longitudinal sectional view of the apparatus shown in FIG. 1.

Referring now to the drawings, the illustrated embodiment of the invention comprises a dryer for extracting moisture from shelled, fresh green peas and includes conventional framework supported upon legs 10. Supported upon the frame is a housing which includes an air supply chamber 12 defined by a bottom plate 14, end plates 15 and side plates 16, 17. Supported upon pairs of sprockets 18, 20 and 22 suitably mounted on the housing is a pervious product carrying conveyor belt 24, the upper run of which extends over the chamber 12 being supported by suitable tracks 26 mounted on the upper edges of the side plates 16, 17. The lower run of the conveyor may be supported on tracks 28 mounted on the legs 10. Suitable means such as a motor 29 is provided to drive the conveyor 24 in the direction indicated in FIG. 2. Extending upwardly over the conveyor belt 24 is a product retaining housing 30 defined by side plates 32, an end plate 34 at the infeed end of the conveyor and an end plate 36 at the discharge end of the conveyor. Preferably a removable top cover is provided on the housing 30 and which may comprise an impervious portion 38 and pervious portions 40, 42 or which cover may be pervious throughout, or provided with sliding covers 41, 43 for the pervious portions 40, 42, the reason for which will be explained hereinafter. The lower portions of the side plates 32 which are contacted by the peas preferably are provided with a protective layer of Teflon or other inert plastic material, indicated at 45.

Means are provided for supplying a large volume of heated drying air or other gas to the chamber 12 and which may comprise a blower 44 driven by a motor 46. Any suitable means may be utilized to supply filtered, heated air to the blower at a temperature which is suitably controlled to prevent overheating of the peas.

The side wall 17 of the chamber 12 is formed with an elongate, longitudinally extending opening 50. Secured to the outer surface of the wall 17 opposite the opening 50 is a duct or plenum 52 defined in part by a top wall 54, a side wall 56 and a bottom wall 58. The opposite side wall of the duct is defined by a plate 60 slidably retained in channels 62 for movement longitudinally of the duct. The plate 60 is about one-half the length of the chamber 12 and has end plates 64 defining pistons secured to the opposite ends thereof and disposed within the duct in sliding engagement with the walls 54, 56 and 58 as best shown in FIG. 5 thus defining sliding end walls for the duct. Means are provide for reciprocating the plate 60 longitudinally of the opening 50, such means in the illustrated embodiment comprising a rack 66 suitably secured on the inner surface of the plate 60 and which rack engages a pinion 68 driven from a motor 70 by means of a shaft 72 supported by pillow blocks 74 mounted upon a divider plate 76 secured to the fixed duct walls and extending across the duct into sliding engagement with the side plate 60. Secured one adjacent each of the opposite ends of the plate 60 is a pair of nozzles 80, 82 in the form of rectangular ducts which communicate with the duct 52. The nozzles extend transversely of the chamber 12 beneath the conveyor 24 and each is provided on its upper surface with a narrow opening 86 through which air may escape upwardly through the conveyor.

Means are provided for supplying air to the duct 52 and which means in the illustrated embodiment comprises a pair of blowers 90 driven by motors 92, one of the blowers being arranged to deliver air to the duct on one side of the partition 76 and the other blower 90 being arranged to deliver air on the opposite side of the partition 76, as most clearly shown in FIG. 4. Flapper valves 94 preferably are mounted on the bottom wall 58 of the duct over the openings from each of the blowers 90 so as to permit air from the blowers to enter the duct 52 but to prevent escape of air through the blowers when they are not operating.

Means are provided to feed the wet peas onto one end of the conveyor belt 24, such means comprising a bin 100 into which the wet peas can be fed in bulk. The bottom edge of the wall 34 is spaced above the conveyor 24 by a distance equal to the desired height of the layer of peas upon the conveyor, the wall thus acting in effect as a weir. It will be apparent that upon movement of the conveyor 24 in the direction of the arrow in FIG. 2 the peas will be drawn from the bin 100 onto the conveyor and carried therealong in a layer 101 toward the discharge end of the conveyor. At the discharge end of the conveyor the bottom edge of the wall 36 is spaced above the conveyor just slightly above the height of the layer of dried peas so that the peas may pass therebeneath and be discharged onto a chute 102 or other collecting means. Any suitable apparatus such as air jets 103 may be provided to remove any peas which stick to the conveyor belt and are not discharged into chute 102.

In operation, and assuming for the moment that a steady state operation has been attained, the wet peas are fed in any suitable manner into the infeed hopper 100 and are fed therefrom at a steady rate onto the conveyor 24. The blower 44 is continuously operated to supply heated air of the desired temperature to the chamber 12 in such a volume that the layer of peas upon the conveyor 24 is not disturbed by the air passing upwardly through the conveyor. At predetermined intervals, the plate 60 is reciprocated longitudinally of the chamber. Preferably the blowers 90 are operated only during the period of movement of the nozzles 80, 82 in the direction from the discharge end of the conveyor toward the infeed end. Air from the respective blowers passes upwardly through the flapper valves 94 and into the plenum chambers which are defined between the fixed divider plate 76 and the movable plates 64 mounted on the opposite ends of the sliding plate 60. The air is then directed through the corresponding nozzle 80 or 82 and upwardly through the opening 86 thereof. The blowers 90 are operated such that the velocity of the air discharged through the nozzle openings 86 is sufficient to lift the peas on the conveyor 24 immediately above such nozzle, as indicated at 104, with the result that such peas are agitated and loosened and redistributed. As will be apparent, the lowermost peas on the conveyor belt 24 will tend to dry faster and the redistribution of the peas will tend to even out the drying rate by the mixing of the upper and lower layers of peas. The nozzles 80, 82 are reciprocated as frequently as is necessary to maintain the peas in a loose, divided condition upon the belt 24, but no oftener. Further, the length and speed of the conveyor 24, the depth of the peas thereon and the temperature and velocity of the drying air are all correlated so that the discharged peas have the desired moisture content. The peas may be dried only sufficiently to remove their stickiness and then dried further in bins through which drying air is passed, or the drying apparatus can be designed and operated to dry the peas completely.

One of the effects of the moving nozzles 80, 82 is that the peas carried on the conveyor 24 are advanced on the conveyor relative to their initial position on the conveyor in the direction opposite to the direction of movement of the nozzles. In other words, as a nozzle moves toward the infeed end of the conveyor 24 the peas which are lifted by the nozzle airstream are actually advanced toward the discharge end of the conveyor at a faster rate than the movement of the conveyor. Consequently the nozzles 80, 82 and conveyor belt 24 in fact constitute a conveyor apparatus in and of themselves wherein the conveyor belt 24 constitutes a supporting table and the air streams the conveying force.

It should be observed that a desirable classifying action of the peas also occurs during the agitation as the nozzles 80, 82 move toward the infeed end. The drier peas will, of course, be relatively lighter than the wetter peas and will be lifted a greater amount by the agitating air stream than the wetter peas, so that upon resettling the wetter peas will be closer to the conveyor belt 24 and thus will be exposed to the warmer, drier air to promote uniform drying of the peas. Accordingly, a vertical classification of peas results. A horizontal classification will also result in that the lighter, drier peas will be thrown by the agitating air stream a further distance toward the discharge end of the drier than will the heavier, wetter peas. Such horizontal classification may be enhanced by arranging the air outlets in the housing over the conveyor belt so that the air emerging from the bed of peas is directed toward the product discharge end thus providing additional air flow to cause movement of the agitated peas toward such end. The velocity and direction of air flow over the bed may be suitably regulated by adjustment of the sliding covers 41, 43, over the pervious portions 40, 42, and, if desired, by providing an air outlet in the wall 36.

If desired, discharge of air through the nozzles 80, 82 may also be made during the traverse of the nozzles in the direction of the infeed and toward the outfeed end of the conveyor. This may be desirable to redistribute the peas on the conveyor belt 24.

To control operation of the blowers 92, any conventional control system utilizing limit switches or other control devices can be utilized. For example, referring to FIG. 6, for each of the motors 92 a switch 110 may be provided mounted on the corresponding nozzle 80 or 82. Each switch is provided with an actuating member 112 adapted at the end of the nozzle stroke nearest the discharge end of the dryer to engage a stop 114 to move the switch to closed position whereupon the corresponding motor will start. Each actuating member 112 is further adapted to engage a second stop 116 at the opposite end of the stroke of the nozzle which effects opening of the switch to stop the motor 92.

In certain instances it may be desirable to supply cold air to the blowers 92 so as to cool the peas and prevent overheating thereof, and in treating other materials gaseous reactants could be introduced through the blowers 92.

While the illustrated embodiment is shown with two agitating air nozzles, obviously the drying apparatus can be constructed with one or any multiple number of air nozzles as desired. It should also be obvious that the structure shown can be adapted to the drying of numerous other particulate like products.

Having illustrated a preferred embodiment of the present invention, it should be apparent to those skilled in the art that the invention permits of modification in arrangement and detail. I claim as my invention all such modifications as come within the true spirit and scope of the appended claims.

I claim:

1. The method of drying a wet, particulate product comprising:
   continuously feeding such product onto one end of a perforate support,
   forcing a drying gas upwardly through said support at a velocity such that said product is substantially undisturbed thereby,
   at predetermined intervals of time agitating said product by directing upwardly through said support a stream of gas having sufficient force to lift said product from said support and moving said stream, while maintaining the same in said upward direction, through said support, lengthwise of said support only in the direction from the opposite end of said support to said one end thereof, and
   continuously removing said product from said opposite end of said perforate support.

2. The method of drying a wet, particulate product comprising:
   continuously feeding such product onto one end of a perforate support,
   forcing a drying gas upwardly through said support at a velocity such that said product is substantially undisturbed thereby,
   at predetermined intervals of time agitating said product by directing upwardly through said support a stream of gas having sufficient force to lift said product from said support and moving said stream, while maintaining the same in said upward direction, through said support, lengthwise of said support only in the direction from the opposite end of said support to said one end thereof,
   directing the gas emerging from said product towards said support opposite end in a path immediately above said product so that motion toward said opposite end is imparted to the agitated product, and
   continuously removing said product from said opposite end of said perforate support.

3. An apparatus for drying a particulate comminuted product, which comprises
   a housing,
   a horizontal, pervious product carrying conveyor extending through said housing for carrying said product therethrough in a given direction,
   said housing defining a chamber beneath said conveyor,
   means for supplying a large volume of drying air to said chamber,
   a nozzle extending transversely of said conveyor beneath the same and arranged to direct a stream of air upwardly through said conveyor,
   means mounting said nozzle for reciprocating movement longitudinally of said conveyor,
   means for reciprocating said nozzle,
   means for supplying air to said nozzle in sufficient volume to effect raising of the product positioned on said conveyor immediately above such nozzle,
   and means for rendering said nozzle air supply means operative only during movement of said nozzle in the direction opposite to said given direction.

4. An apparatus for drying a particulate product, which comprises
   a housing,
   a horizontal pervious product carrying conveyor, extending through said housing for carrying said product therethrough in a given direction,
   means for feeding said product onto said conveyor in a layer of predetermined thickness,
   said housing defining a chamber beneath said conveyor,
   means for supplying drying air to said chamber in such volume that passage of said air through the said product on said conveyor does not disturb the same,
   a nozzle extending transversely of said conveyor beneath the same and arranged to direct a stream of air upwardly through said conveyor,
   means mounting said nozzle for reciprocating movement longitudinally of said conveyor,
   means for reciprocating said nozzle,
   means for supplying air to said nozzle in sufficient volume to effect raising of the product positioned on said conveyor immediately above such nozzle,
   and means for rendering said nozzle air supply means operative only during movement of said nozzle in the direction opposite to said given direction.

5. An apparatus for drying green peas or the like comprising
   a perforated conveyor,
   means for driving said conveyor in a predetermined direction,
   means for feeding peas onto said conveyor,
   a housing defining a plenum chamber beneath said conveyor,
   means for passing drying air to said chamber so that the same may pass upwardly through said conveyor and the peas thereon,
   said housing having a side wall extending longitudinally of said conveyor and a longitudinally extending opening in said wall,
   means defining a duct facing said opening,
   a plate, slidably mounted on said wall in overlapping relation to said opening for movement longitudinally thereof,
   a pair of nozzle means mounted on said plate one adjacent each end thereof and communicating through said plate with said duct, said nozzles each having a discharge opening for directing air upwardly through said conveyor,
   said plate having a piston means at each of its opposite ends slidably received within said duct,
   air supply means for introducing air to said duct at an intermediate point thereof at such velocity that air escaping through said nozzles will elevate the peas on said conveyor,
   means for reciprocating said plate,
   and means for effecting operation of said air supply means only during movement of said plate and nozzles in the direction toward the feed end of said conveyor.

6. An apparatus for drying green peas or the like comprising
   a perforated conveyor,
   means for driving said conveyor in a predetermined direction,
   means for feeding peas onto said conveyor,
   a housing defining a plenum chamber beneath said conveyor,
   means for passing drying air to said chamber so that the same may pass upwardly through said conveyor and the peas thereon,
   said housing having a side wall extending longitudinally of said conveyor and a longitudinally extending opening in said wall,
   means defining a duct facing said opening,
   a plate slidably mounted on said wall in overlapping relation to said opening for movement longitudinally thereof, nozzle means mounted on said plate and communicating through said plate with said duct, said nozzle having a discharge opening for directing air upwardly through said conveyor, said plate having a piston means at each of its opposite ends slidably received within said duct, air supply means for introducing air to said duct at an intermediate point thereof at such velocity that air escaping through said nozzle will elevate the peas on said conveyor, and means for reciprocating said plate.

References Cited by the Examiner

UNITED STATES PATENTS

| Re. 5,711 | 12/1873 | Lacroix | 209—380 |
| 986,226 | 3/1911 | Schwartz | 34—10 X |
| 2,166,056 | 7/1939 | Johnston | 34—236 X |

FOREIGN PATENTS

| 305,283 | 2/1933 | Italy. |

DONLEY J. STOCKING, *Primary Examiner.*

FREDERICK L. MATTESON, JR., *Examiner.*

D. A. TAMBURRO, *Assistant Examiner.*